United States Patent
Rund et al.

(10) Patent No.: US 6,854,883 B2
(45) Date of Patent: Feb. 15, 2005

(54) FOOD SAFETY THERMOMETER

(75) Inventors: Richard Rund, Great Falls, VA (US); Pierre Charlety, Deng Chau (HK)

(73) Assignee: F.O.B. Instruments, Ltd., Wanchai (HK)

( * ) Notice: Subject to any disclaimer, the term of this patent is extended or adjusted under 35 U.S.C. 154(b) by 0 days.

(21) Appl. No.: 10/374,038

(22) Filed: Feb. 27, 2003

(65) Prior Publication Data

US 2004/0170213 A1 Sep. 2, 2004

(51) Int. Cl.[7] .................. G01K 15/00; G01K 7/14; G01K 1/20
(52) U.S. Cl. .................. 374/208; 374/170; 374/1; 374/3; 116/216
(58) Field of Search .................. 374/1, 2, 170, 374/163, 208, 3; 116/200, 216

(56) References Cited

U.S. PATENT DOCUMENTS

| | | | |
|---|---|---|---|
| 3,499,310 A | | 3/1970 | Hundere et al. |
| 3,859,644 A | * | 1/1975 | Main .................. 99/344 |
| 4,443,851 A | * | 4/1984 | Lin .................. 600/551 |
| 4,475,823 A | * | 10/1984 | Stone .................. 374/1 |
| 4,626,662 A | * | 12/1986 | Woolf .................. 219/501 |
| 4,761,539 A | * | 8/1988 | Carmean .................. 219/497 |
| 4,800,513 A | * | 1/1989 | Deutsch .................. 702/107 |
| 5,001,657 A | * | 3/1991 | Yagura et al. .................. 702/99 |
| 5,181,521 A | * | 1/1993 | Lemelson .................. 600/549 |
| 5,398,597 A | * | 3/1995 | Jones et al. .................. 99/330 |
| 5,519,644 A | * | 5/1996 | Benton .................. 702/88 |
| 5,775,488 A | | 7/1998 | Vaught |
| 5,857,777 A | * | 1/1999 | Schuh .................. 374/172 |
| 5,983,783 A | * | 11/1999 | Archard et al. .................. 99/342 |
| 6,000,845 A | * | 12/1999 | Tymkewicz et al. .................. 374/155 |
| 6,045,260 A | | 4/2000 | Schwartz et al. |
| 6,058,356 A | * | 5/2000 | Swanson et al. .................. 702/99 |
| 6,065,391 A | * | 5/2000 | Archard et al. .................. 99/342 |
| 6,170,983 B1 | | 1/2001 | Germanow |
| 6,299,350 B1 | | 10/2001 | Booth et al. |
| 6,515,484 B1 | * | 2/2003 | Bald et al. .................. 324/551 |
| 6,568,848 B1 | * | 5/2003 | Chapman et al. .................. 374/155 |
| 2003/0112845 A1 | * | 6/2003 | Kaiser et al. .................. 374/141 |
| 2003/0133491 A1 | * | 7/2003 | Shih .................. 374/163 |
| 2003/0202558 A1 | * | 10/2003 | Chung et al. .................. 374/155 |

FOREIGN PATENT DOCUMENTS

JP        58117429    *  7/1983    .................. 374/170

* cited by examiner

*Primary Examiner*—Gail Verbitsky
(74) *Attorney, Agent, or Firm*—Cahn & Samuels, LLP.

(57) ABSTRACT

A food safety thermometer is provided that is easily calibratable. The thermometer includes a digital display for displaying the temperature of food items under measurement. A calibration unit is coupled to the digital display. The calibration unit generates a calibration alert when the measured temperature is maintained within a calibration range for a predetermined period of time (the calibration period). If the user elects to calibrate the thermometer during the calibration period, the may activate the calibration unit and the calibration unit drives the measured temperature to the calibration temperature.

11 Claims, 4 Drawing Sheets

FOOD SAFETY THERMOMETER

I. FIELD OF THE INVENTION

This invention relates to the food safety. More particularly, this invention relates to thermometers for detecting and identifying safe temperatures for cooked food items.

II. BACKGROUND OF THE INVENTION

Food safety is a field that has received increased attention in recent years. It has long been known that disease causing microorganisms such as bacteria grow very slowly at low temperatures, multiply rapidly in mid-range temperatures and are killed at high temperatures. For safety, perishable foods must be held at proper cold temperatures to inhibit bacterial growth or cooked to temperatures high enough to kill harmful microorganisms.

Many food handlers, cooks and chefs are of the mistaken belief that color, touch or other visible signs are reliable indicators for determining whether foods are cooked to their "safe state". As used herein, the term "safe state" refers to a point where the food item has been cooked to an internal temperature high enough and for a sufficient duration to destroy any harmful microorganisms that may be present. The United States Department of Agriculture has determined that color and texture are not reliable indicators of food safety. For example, ground beef may turn brown before it reaches its safe state. A lay food handler preparing hamburger patties and using the brown color as an indicator of doneness is assuming a significant risk that pathogenic microorganisms may survive. On the other hand, hamburger patties cooked to 160° F. and held at least at 160° F. for a minimum of 15 seconds have reached the safe state regardless of their color or texture.

The temperature at which foods reach the safe state varies, as does the safe state temperature for different food items. A roast or steak that is not pierced in any way during processing or preparation and reaches an internal temperature of 145° F. is in its safe state. A lay food handler looking for a visual sign of doneness might continue cooking the steak until it is overcooked and dry. As used herein, "doneness" refers to when a food item is cooked to a desired state and indicates the sensory aspects of foods such as texture, appearance, and juiciness. Unlike the temperatures required to reach the safe state, these sensory aspects are subjective. Likewise, poultry does not enter the safe state until it has reached at least 160° F. throughout. However at this temperature, the meat has not reached a traditional "done" texture and color. Accordingly, many lay food handlers prefer to cook poultry longer (to a higher temperature).

As opposed to relying on visual inspection, food handlers should employ thermometers to ensure that food items have reached their safe state. Thermometers should also be used to ensure that cooked foods are held at safe temperatures until served, i.e., 40° F. or below, or 140° F. and above. However, the present inventors are aware of no thermometer that provides an indication to the user when food items have reached their safe state.

There are a variety of types of food thermometers currently available. Food thermometers are commonly categorized according to the type of temperature sensor they use. For example, there are thermocouple thermometers which measure temperature at the junction of two wires located in the tip of the probe. There are thermistor thermometers which employ thermistors bonded in the tip of the probe typically with epoxy. In addition, there are bimetallic coil thermometers which contain a helix coil in the probe made of two different metals that are bonded together. The metals have different rates of expansion. The coil, which is connected to the temperature indicator, expands when heated.

There are several known thermometers that provide audible alerts when a food item has reached a prescribed temperature. For example, U.S. Pat. No. 3,778,798 discloses a thermistor thermometer that produces an audible alarm when the internal temperature of the food reaches a predetermined level.

U.S. Pat. No. 4,083,250 discloses a portable food thermometer having a probe loaded with a controlled volume of temperature sensitive material. The thermometer includes mechanical components that produce an audible alarm when a preset temperature is reached.

U.S. Pat. No. 6,431,110 discloses a bimetallic thermometer that may be manually preset to a desired temperature. A bimetallic spring is mechanically linked to the alarm mechanism such that the alarm is triggered upon expansion of the spring due to heating.

It is important to note that each of the prior art patents only provide notification when food has reached a predetermined temperature. Such notification may be characterized as a doneness alert. However, food items are not safe to eat until they have 1) reached their safe temperature and 2) remained at their safe temperature for a specified period of time. Thus, none of the foregoing provides the food handler with notification that food items have reached their safe state.

Because of the potentially serious effects of food borne illness, it is particularly important that all food thermometers are accurate. Accuracy of a thermometer is its ability to measure temperature correctly without error. A thermometer must be within ±2° C. (±5° F.) of the actual temperature to be considered an accurate device.

It is recommended that new thermometers be calibrated upon receipt and prior to being put into service. If thermometers are used on a continual basis, they should be calibrated at least once a day. They should also be calibrated whenever they are dropped, and when going from one temperature extreme to another. In addition, in the case of thermistor-based thermometers, they sometimes become uncalibrated because the physical orientation of the thermistor becomes disturbed due to the constant displacement of the probe tip.

The prior art has attempted to address calibration issues by providing calibratable thermometers. For example, U.S. Pat. No. 4,475,823 describes a self-calibrating thermistor type thermometer that employs a calibration circuit including a reference thermistor that produces a corrective signal which is applied to the signal generated by the probe thermistor to compensate for any faulty calibration of the probe thermistor. While this thermistor provides a measure of self-calibration, the accuracy of its calibration is dependent upon the accuracy of the reference thermistor. It is believed that the conditions that cause the probe thermistor to become uncalibrated are likely to cause the reference thermistor to become uncalibrated.

Notwithstanding the usefulness of the above-described products, a need still exists for a calibratable food safety thermometer that notifies the food handler when food items have reached their safe state.

III. SUMMARY OF THE INVENTION

It is an object of the invention to provide a device to improve food safety.

It is another object of the invention to provide thermometer that is easily and reliably calibratable.

It is yet another object of the invention to provide a simple calibratable thermometer that measures the temperatures of a food item and the length of time that the food item holds that temperature.

In accordance with one aspect of the invention, a calibratable food safety thermometer is presented. The calibratable food safety thermometer includes a probe having a temperature-sensing device disposed in a proximal end thereof. A digital display is preferably in communication with the temperature-sensing device. The digital display displays the temperature of the food item. A calibration unit is provided in communication with the digital display. The calibration unit alerts the user when the measured temperature is maintained within a calibration range during a calibration period. The calibration unit further drives the digital display to a calibration temperature responsive to user input during the calibration period.

In accordance with another aspect of the invention, a method of calibrating a food safety thermometer is presented. In keeping with the method, the temperature of a calibration source is measured. A calibration alert is generated when the temperature of a calibration source is maintained between first and second temperatures during a calibration period. The measured temperature is changed to the calibration temperature responsive to user input received during the calibration period.

In accordance with still another aspect of the invention, a calibratable food safety thermometer is presented. In keeping this aspect of the invention, the calibratable food safety thermometer includes a probe having a temperature-sensing device disposed in a proximal end thereof. A digital display is preferably in communication with the temperature-sensing device. The digital display displays the temperature of the food item. A safe state alert indicator provides a safe state alert when the temperature-sensing device indicates that the food item has reached a safe state temperature and maintained the safe state temperature for a predetermined period of time. A calibration unit is provided in communication with the digital display. The calibration unit alerts the user when the measured temperature is maintained within a calibration range during a calibration period. The calibration unit further drives the digital display to a calibration temperature responsive to user input during the calibration period.

IV. BRIEF DESCRIPTION OF THE DRAWINGS

V. DETAILED DESCRIPTION OF THE DRAWINGS

Figure 1A:
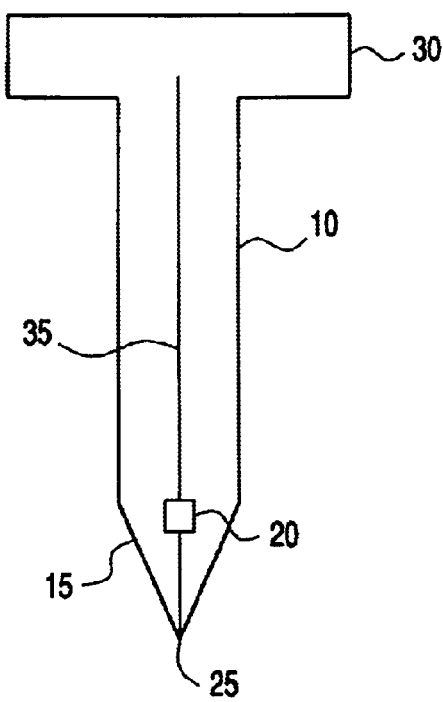
FIG. 1A illustrates a cross-sectional view of a food safety thermometer in accordance with a first embodiment of the invention.
Figure 1B:
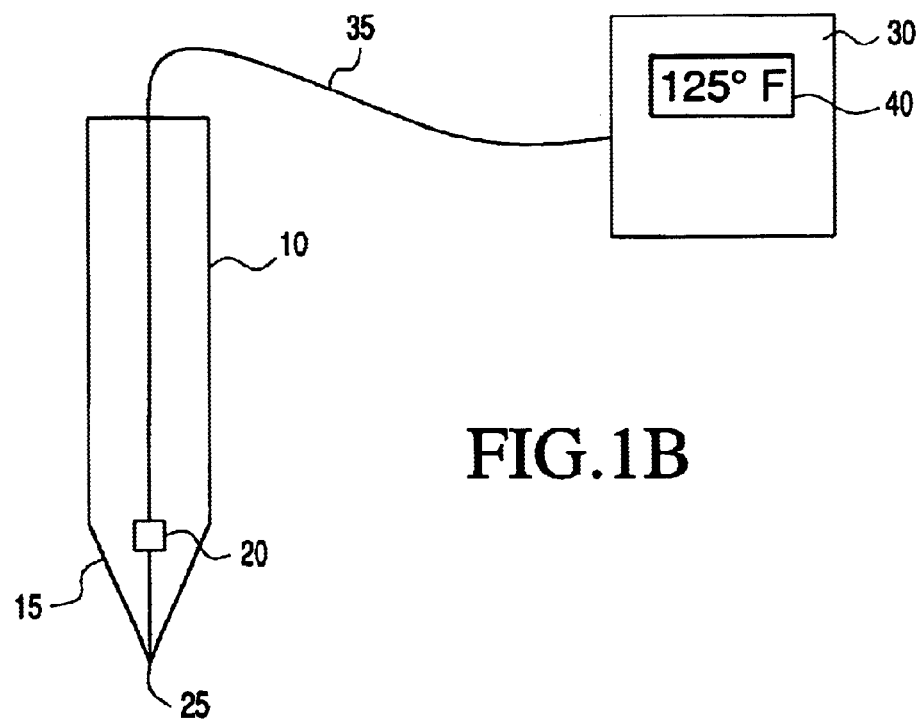
FIG. 1B shows a food safety thermometer in accordance with another embodiment of the invention.

The present invention may be embodied in a standard food safety thermometer. As illustrated in FIGS. 1A and 1B, a thermometer in accordance with the invention may comprise a probe 10 having a tip 15 configured for ready insertion into food items. A temperature sensing element 20 is preferably disposed in tip 15 as close as practicable to the apex and may be held in place by an epoxy compound. Temperature sensing element 20 is preferably a resistive element, e.g., a thermistor. A Semitec 104 GT-1 thermistor available from Semitec Ishizuka Electronics Corporation of Tokyo Japan is particularly preferred. Alternatively, temperature-sensing element 20 may be a thermocouple element or resistive temperature device.

Temperature sensing element 20 is provided in communication with a display unit 30. As illustrated in FIGS. 1A, probe 10 may be fixedly attached to display unit 30. Referring to FIG. 1B, probe 10 may be separated from display unit 30 and connected thereto via lead wire 35. Alternatively, probe 10 may be wirelessly connected to display unit 30.

In operation, temperature sensing element 20 generates a signal indicative of the temperature of the food item. The signal is communicated to display unit 30, which includes a digital display 40 and translation circuitry that converts the signal to a digital representation of temperature.

As previously mentioned, one cannot reliably make a determination of safety from mere inspection of the food item. Ensuring that food items have reached their safe state is important to all food handlers but is particularly important for backyard grillers. Grilling causes food items to appear done and, presumably safe to eat, when in fact they are neither done nor safe to eat.

Figure 2:
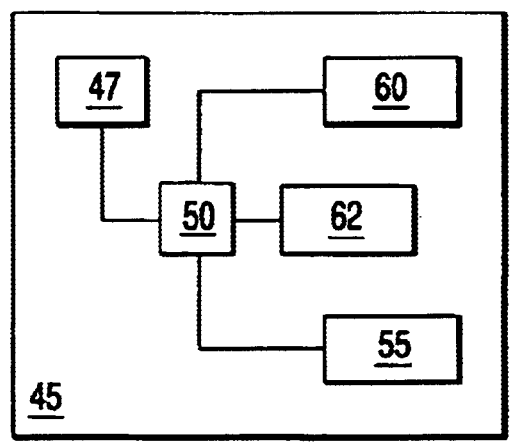
FIG. 2 depicts a block diagram of the safe state indicator of the present invention.

The food safety thermometer of the present invention provides a safe state indicator 45 to alert the user that food items have reached their safe state, i.e., that they are sufficiently cooked to be safe to eat. FIG. 2 illustrates a block diagram of safe state indicator 45. As shown, safe state indicator 45 includes a safe state condition unit 47 in communication with a timer 50, which in turn is in communication with an audible indicator 55 and/or a visual indicator 60 and/or a vibratory indicator 62. Safe state condition unit 47 preferably stores safe state conditions, i.e., safe temperatures for respective food items as well as time periods that the safe temperature must be maintained (safe temperature hold time). When the designated safe temperature has been reached, timer 50 is activated. When timer 50 reaches the safe temperature hold time, one or both of visual indicator 60 and audible indicator 55 generate a safe state alert.

In accordance with a preferred aspect of the invention, safe state indicator 47 includes preprogrammed safe state conditions. Such safe state conditions preferably include safe state temperatures and safe state hold times for a plurality of food items. Presently preferred safe state conditions are those recommended by the U.S. Department of Agriculture as set forth in Table 1 below.

TABLE 1

| SAFE TEMPERATURE °F. | SAFE TEMPERATURE HOLD TIME | FOOD ITEM |
|---|---|---|
| 165 | 15 seconds | Poultry - chicken, turkey, duck, goose - whole parts or ground soups, stews, stuffing, casseroles, mixed dishes stuffed meat, poultry, |

TABLE 1-continued

| SAFE TEMPERATURE ° F. | SAFE TEMPERATURE HOLD TIME | FOOD ITEM |
|---|---|---|
| | hold covered for 2 minutes after removal | fish and pasta leftovers (to reheat) food, covered, cooked in microwave oven |
| 155 | 15 seconds | hamburger, meatloaf and other ground meats; ground fish; fresh shell eggs - cooked and held for service |
| 145 | 15 seconds | beef, lamb, veal, pork - steaks or chops |
| | | fish, shellfish fresh shell eggs - broken, cooked and served immediately |
| | 4 minutes | beef, corned beef, pork, ham - roasts |
| 140 | 15 seconds | ham, other roasts-processed, fully cooked (to reheat) fruits and vegetables that are cooked |

In some embodiments, the food handler may be able to input his own safe state conditions and/or modify the preprogrammed safe state conditions.

In keeping with the invention, as is apparent to skilled artisans, safe state indicator 45 may be implemented by an appropriately programmed microcontroller. A preferred microcontroller is the Oki MSM 64162A available from Oki Electric Industry of Japan.

In keeping with the invention, visual indicator 60 may comprise a light source such as an LED, miniature incandescent source, a halogen source or other known source. The safe state alert may be a continuously activated light source or an intermittent, e.g., flashing or blinking, light source. Visual indicator 60 is particularly useful for hearing impaired individuals and when cooking in noisy environments where the user may not hear audible indicator 55.

Further in keeping with the invention, audible indicator 55 may comprise an alarm, a digital voice messaging device or any other sound producing device. Accordingly, the safe state alert generated by audible indicator 55 may be one or a combination of a continuous or intermittent alarm and a voice message.

Still in keeping with the invention, vibratory indicator 62 may comprise a conventional vibratory alarm such as that taught in U.S. Pat. No. 5,089,998.

If desired, the safe state alert may comprise a combination of audible indicators and visual indicators to maximize the likelihood of attracting the attention of the food handler. Such a feature is particularly useful for food items that are sensitive to overcooking.

Figure 3:
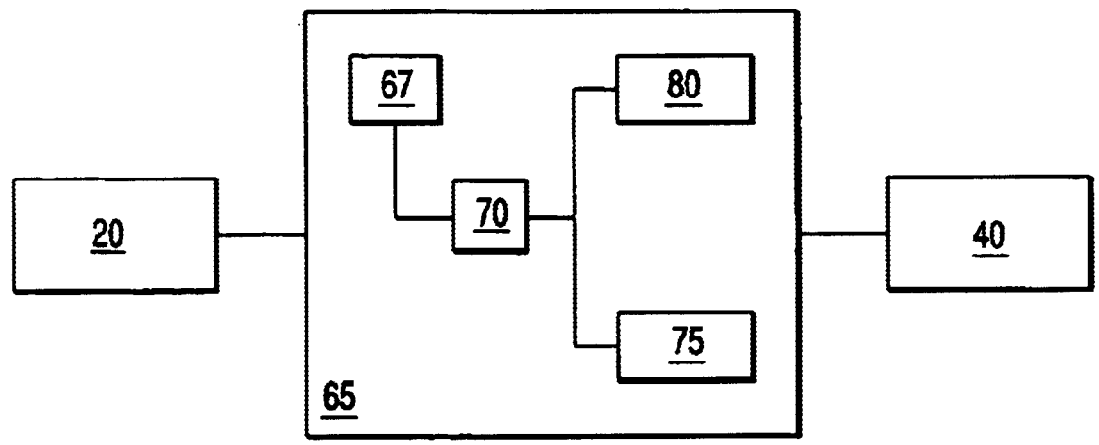
FIG. 3 illustrates a block diagram of a calibration unit in accordance with the invention.

In accordance with another embodiment of the invention, means for automatically calibrating the food safety thermometer are provided. As shown in FIG. 3, a calibration unit 65 is provided in communication with digital display 40 and temperature sensing element 20. Calibration unit 65 includes a calibration temperature-sensing element 67 in communication with a timer 70. Calibration temperature sensing element 67 may also be in communication with visual indicator 80 and audible indicator 85 in some embodiments. Calibration unit 65 preferably includes a calibration temperature that may be fixed but is preferably user selectable.

In operation, the food handler brings probe 10 into contact with a calibration source, an object or liquid that the food handler knows to have a relatively constant temperature. When calibration temperature sensing element 67 detects a temperature within a calibration temperature range, calibration unit 65 preferably initiates timer 70 and generates a calibration alert for a finite period of time (the calibration period). For example, calibration unit 65 causes digital display 40 to flash, initiates visual indicator 80 and/or initiates audible indicator 85. In keeping with an aspect of the invention, visual indicator 80 may include one or more LEDs. Audible indicator 85 may comprise an alarm or a voice message informing the user that the thermometer is prepared for calibration. In any case, the calibration alert informs the food handler that the thermometer is ready for calibration.

Figure 4:
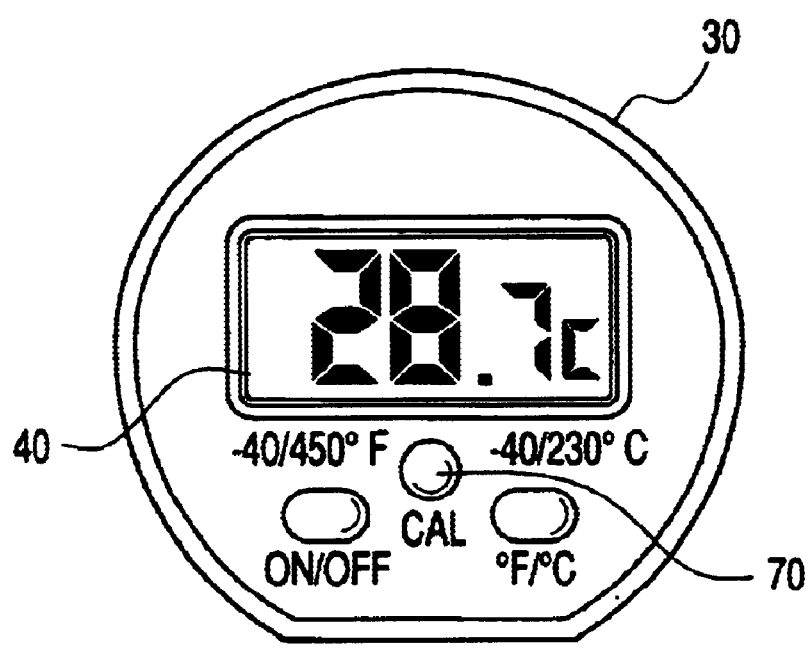
FIG. 4 shows a temperature display unit in accordance with the invention.

While the display is flashing, the user may initiate calibration by, e.g., depressing a calibration button 75 disposed on the display unit (FIG. 4). When activated, calibration unit 65 may cause digital display 40 to display a message indicating that the thermometer is calibrating. Calibration unit 65 determines the difference between the measured temperature and the calibration temperature. This difference is referred to herein as the calibration factor. The calibration factor is stored and digital display 40 displays the calibration temperature. In future readings, calibration unit 65 adjusts the measured temperature by adding the calibration factor and digital display 40 preferably displays only the adjusted temperature. Hence, the temperature adjustment is achieved unbeknownst to the, food handler. This enhances the thermometer's ability to produce accurate readings.

In accordance with the invention and as recognized by skilled artisans, calibration unit 65 may be realized by an appropriately programmed microcontroller. A preferred microcontroller is the Oki MSM 64162A available from Oki Electric Industry of Japan.

Figure 5:
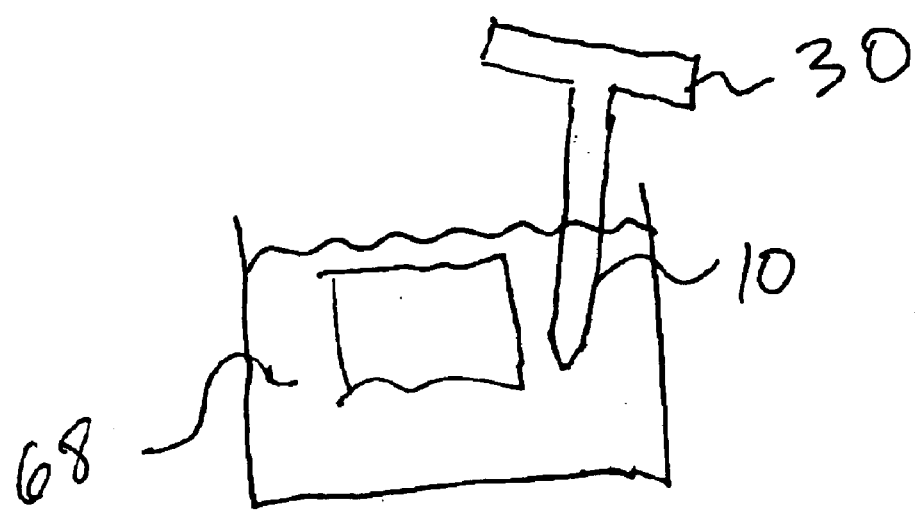
FIG. 5 illustrates a food safety thermometer and a calibration source.

In keeping with a preferred aspect of the invention, the thermometer may be calibrated with respect to any known calibration source 68 illustrated in FIG. 5. A preferred calibration source 68 is a freezing point calibration source. Alternatively, it is believed that the thermometer may be calibrated with respect to a boiling point calibration source. If the thermometer is intended for low temperature applications, freezing point calibration is preferred. If the thermometer is intended for high temperature applications, then boiling point calibration is preferred.

To calibrate the thermometer with a freezing point calibration source, the user may prepare a mixture of a small block of ice and water. It is known that the temperature of this mixture is 32° F., the calibration temperature. Probe 10 may be inserted into the mixture and, after a slight delay, e.g., 5 seconds, if digital display 40 shows the temperature to be within a calibration range (between about 29° F. and about 35° F.) the calibration alert is triggered and digital display 40 begins to blink. While the digital display 40 is blinking, the user may activate calibration button 75. The calibration unit then determines the calibration factor, the difference between the calibration temperature and the measured temperature, and stores the calibration factor in memory and calibration unit 65 drives digital display 40 to display the calibration temperature. In future temperature readings, calibration unit 65 adjusts the temperature sensed by temperature sensing element 20 by the calibration factor. Upon subsequent calibration, a new calibration factor is generated.

A similar process may be followed to calibrate the thermometer with a boiling point calibration source. Instead of inserting probe 10 into a water/ice mixture the user inserts probe 10 into boiling water. The calibration range is then selected to be between, e.g., 209° F. and 215° F. and the calibration temperature is 212° F., depending upon altitude. In keeping with the invention, other known temperature calibration sources may be utilized.

The inventors recognize that the user may want to measure food items that have a temperature within the calibration range. In preferred embodiments, the calibration alert has a duration of at least 3 seconds. More preferably the calibration alert has a duration of between 4 and 8 seconds. Most preferably, the calibration alert has a duration of about 5 seconds. If the user does not want to calibrate the thermometer, he simply refrains from depressing calibration button 70 during the calibration period. Digital display 40 will then stop blinking and display the measured temperature.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

We claim:

1. A calibratable food safety thermometer comprising:
    a probe including a distal end and a proximal end, the proximal end including a temperature sensing device;
    a digital display in communication with said temperature sensing device that displays a temperature of the food item sensed by the temperature sensing device; and
    a calibration unit in communication with said digital display that a) provides a calibration alert for a calibration period when the temperature sensing element measures a temperature within a calibration temperature range, b) drives the digital display to a calibration temperature responsive to an activation signal received during the calibration period, and c) causes digital display to display the temperature sensed by the temperature sensing device after the calibration period in the absence of reception of the activation signal during the calibration period.

2. The calibratable food safety thermometer of claim 1 wherein the calibration period has a duration of at least 3 seconds.

3. The calibratable food safety thermometer of claim 2 wherein the calibration alert has a duration of between 4 and 8 seconds.

4. The calibratable food safety thermometer of claim 1 wherein said calibration unit includes a user selectable calibration temperature.

5. The calibratable food safety thermometer of claim 1 wherein the calibration alert includes a flashing message on the digital display.

6. The calibratable food safety thermometer of claim 1 wherein the calibration alert includes an alarm.

7. The calibratable food safety thermometer of claim 1 wherein the calibration alert includes a voice message.

8. The calibratable food safety thermometer of claim 1 wherein the calibration unit includes a calibration temperature and the calibration unit calculates a calibration factor responsive to the activation signal.

9. The calibratable food safety thermometer of claim 8 wherein said calibration unit adds the calibration factor to temperatures measured by the temperature-sensing device.

10. A calibratable food safety thermometer comprising:
    a probe including a distal end and a proximal end, the proximal end including a temperature sensing device;
    a digital display in communication with said temperature sensing device that displays the temperature of the food item;
    a safe state alert indicator that provides a safe state alert when the temperature sensing device indicates that the food item has reached a safe state temperature and maintained the safe state temperature for a predetermined period of time; and
    a calibration unit in communication with said digital display that a) provides a calibration alert during a calibration period when the temperature sensing device measures a temperature within a calibration temperature range, b) drives the digital display to a calibration temperature responsive to an activation signal received during the calibration period, and c) causes said digital display to display the measured temperature after the calibration period in the absence of reception of the activation signal during the calibration period.

11. The calibratable food safety thermometer of claim 10 wherein the predetermined period of time for which the safe state is maintained is the safe state hold time and wherein the safe state hold time corresponds to the food item.

* * * * *